(12) United States Patent
Bard et al.

(10) Patent No.: US 9,028,143 B2
(45) Date of Patent: May 12, 2015

(54) SENSOR ARRANGEMENT AND MEASURING ARRANGEMENT

(75) Inventors: Oliver Bard, Falkensee (DE); Wolfgang Grundmann, Birkenwerder (DE); Michael Kubiak, Berlin (DE)

(73) Assignee: Epcos AG, Munich (DE)

( * ) Notice: Subject to any disclaimer, the term of this patent is extended or adjusted under 35 U.S.C. 154(b) by 148 days.

(21) Appl. No.: 13/267,475

(22) Filed: Oct. 6, 2011

(65) Prior Publication Data

US 2012/0051393 A1    Mar. 1, 2012

Related U.S. Application Data

(63) Continuation of application No. PCT/EP2010/054604, filed on Apr. 7, 2010.

(30) Foreign Application Priority Data

Apr. 9, 2009 (DE) .......................... 10 2009 017 230

(51) Int. Cl.
*G01K 9/00* (2006.01)
*G01K 1/08* (2006.01)
*G01K 1/14* (2006.01)
*G01D 11/24* (2006.01)
*G01K 1/16* (2006.01)

(52) U.S. Cl.
CPC .. *G01K 1/08* (2013.01); *G01K 1/14* (2013.01); *G01D 11/245* (2013.01); *G01K 1/16* (2013.01)

(58) Field of Classification Search
CPC ......... G01K 1/14; G01K 13/002; G01K 1/08; G01K 13/02; G01K 1/143
USPC ........................................................ 73/366.5
See application file for complete search history.

(56) References Cited

U.S. PATENT DOCUMENTS

| 4,407,141 | A | 10/1983 | Paddock |
| 6,642,704 | B2 | 11/2003 | Hastings et al. |
| 6,997,605 | B2 * | 2/2006 | Trapp et al. ................... 374/172 |
| 2002/0048308 | A1 | 4/2002 | Knittel et al. |
| 2003/0086477 | A1 * | 5/2003 | Tola .............................. 374/208 |
| 2004/0223534 | A1 * | 11/2004 | Trapp et al. ................... 374/172 |
| 2009/0245324 | A1 * | 10/2009 | Sunaga et al. ................. 374/142 |

FOREIGN PATENT DOCUMENTS

| CN | 1409120 A | 4/2003 |
| DE | 7219095 U | 11/1972 |
| DE | 0808089 | * 11/1997 |
| DE | 103 16 010 A1 | 11/2004 |
| DE | 100 49 979 C5 | 12/2005 |
| DE | 10 2005 002 363 B3 | 8/2006 |
| EP | 0 808 089 A1 | 11/1997 |
| JP | 59-143261 U | 9/1984 |
| JP | 04-118535 A | 4/1992 |
| JP | 05-079865 A | 3/1993 |

* cited by examiner

*Primary Examiner* — Lisa Caputo
*Assistant Examiner* — Nasir U Ahmed
(74) *Attorney, Agent, or Firm* — Slater & Matsil, L.L.P.

(57) ABSTRACT

A sensor arrangement includes at least two sensor components. Each sensor component includes a housing with at least one sensor element. The housings each include at least one connecting device. The at least one connecting device can be used to mechanically connect the at least two sensor components to one another.

17 Claims, 3 Drawing Sheets

SENSOR ARRANGEMENT AND MEASURING ARRANGEMENT

This application is a continuation of co-pending International Application No. PCT/EP2010/054604, filed Apr. 7, 2010, which designated the United States and was not published in English, and which claims priority to German Application No. 10 2009 017 230.0, filed Apr. 9, 2009, both of which applications are incorporated herein by reference.

BACKGROUND

The German publication DE 10 2005 002 363 B3 discloses a sensor arrangement having at least two sensor elements. The sensor elements are arranged in a common housing.

SUMMARY OF THE INVENTION

In one aspect, the invention specifies a sensor arrangement that detects the temperatures at an interface between at least two temperature zones.

A sensor arrangement comprising at least two sensor components is specified. The sensor components each comprise a housing with at least one sensor element. The housings of the sensor components each comprise at least one part of a connecting device which can be used to mechanically connect the at least two sensor components of the sensor arrangement to one another.

In one embodiment of the sensor arrangement, the sensor elements of the at least two sensor components are thermally insulated from one another.

In one embodiment, the sensor arrangement consists of at least two individual independent sensor components which are thermally decoupled from one another.

In one embodiment of the sensor arrangement, at least one sensor element is arranged in a cavity of the sensor component. In another embodiment, at least one sensor element is arranged in a depression in the housing wall on the outside or on an outer surface of the housing wall of a sensor component. In one embodiment, the sensor element is encased with a potting compound in order to protect against corrosion or destruction.

In order to detect the temperatures at an interface between two temperature zones as independently as possible, the sensor elements are arranged such that they are spatially separate, with the result that the sensor elements are thermally and spatially decoupled from one another.

In one embodiment of the sensor arrangement, the connecting device of the sensor components is in the form of a tongue-and-groove plug-in connection. At least one sensor component has at least one groove. At least one further sensor component has at least one tongue which fits into the groove of the one sensor component. The groove and the tongue are preferably designed in such a manner that they can be plugged into one another and together have a preferably form-fitting connection.

In one embodiment of the sensor arrangement, the tongue-and-groove plug-in connection is in the form of a dovetail connection or a fir tree connection. The groove of one component is at least designed in such a manner that the tongue of the further component preferably fits into the groove in a form-fitting manner.

In one embodiment of the sensor arrangement, the tongue is in the form of a separate connecting piece which is arranged on the housing of the sensor component or is mechanically connected to the latter, for example, adhesively bonded. In another embodiment, the tongue is an integrally formed part of the sensor component to be connected. The tongue is plugged into the housing of the sensor component.

In one embodiment of the sensor arrangement, each of the sensor components has at least two electrical connecting contacts for electrically connecting the sensor elements. In one embodiment in which a sensor component has more than one sensor element, electrical contacts of the respective sensor elements form the electrical connection of the sensor component.

In one embodiment of the sensor arrangement, at least one sensor element is arranged on a printed circuit board. In one embodiment, the printed circuit board is preferably arranged in the housing of one of the sensor components. In one embodiment, the printed circuit board has at least two electrical connecting contacts. In one embodiment of the sensor arrangement, further electrical components are arranged on the printed circuit board.

In one embodiment of the sensor arrangement, the housings of the sensor components contain at least a plastic. In the embodiment of the sensor components as temperature sensors, the housing of the sensor components preferably has good thermal properties at least in the region of the sensor elements. The housing preferably has good thermal conductivity in the region of the sensor element. When the sensor elements are in the form of optical sensors, the housing of the sensor components has an optically transparent region, preferably in the infrared range, at least in the region of the sensor elements. The optically transparent region of the at least one sensor component is in the form of a preferably optically transparent cap, for example. The cap comprises a material which is preferably optically transmissive to radiation in the infrared range.

In one embodiment of the sensor arrangement, at least two of the sensor elements are in the form of temperature sensor elements. The temperature sensor elements are preferably in the form of NTC (component with a negative temperature coefficient) elements. In another embodiment, the temperature sensor elements are in the form of PTC (component with a positive temperature coefficient) elements.

In one embodiment of the sensor arrangement, at least one sensor component has at least two sensor elements, a first sensor element being in the form of an optical sensor, and a further sensor element being in the form of an NTC element. The optical sensor is preferably a photodiode for detecting the thermal radiation from a radiation source. The NTC element is preferably used to detect the convection heat and/or the thermal radiation from a radiation source.

A measuring arrangement for detecting at least two temperature zones using a sensor arrangement described is also specified, at least one sensor element of a first sensor component detecting the temperature of a first temperature zone. At least one sensor element of a second sensor component detects the temperature of a second temperature zone.

The sensor arrangement described above and the measuring arrangement are preferably used when detecting the inside temperature of a motor vehicle. A sensor arrangement as described makes it possible to detect the temperature at the interface between two temperature zones. The mutual influence of the sensor elements is minimized by housings which are thermally decoupled from one another. The temperatures of at least two adjacent temperature zones can thus be detected with one common component.

BRIEF DESCRIPTION OF THE DRAWINGS

The sensor arrangement and the measuring arrangement are explained in more detail using the following figures and exemplary embodiments. The drawings should not be interpreted as being true to scale. Rather, individual dimensions of the illustrations may be increased, decreased or else distorted. Elements which are the same as one another or which undertake the same function have the same reference symbol.

Figure 1:
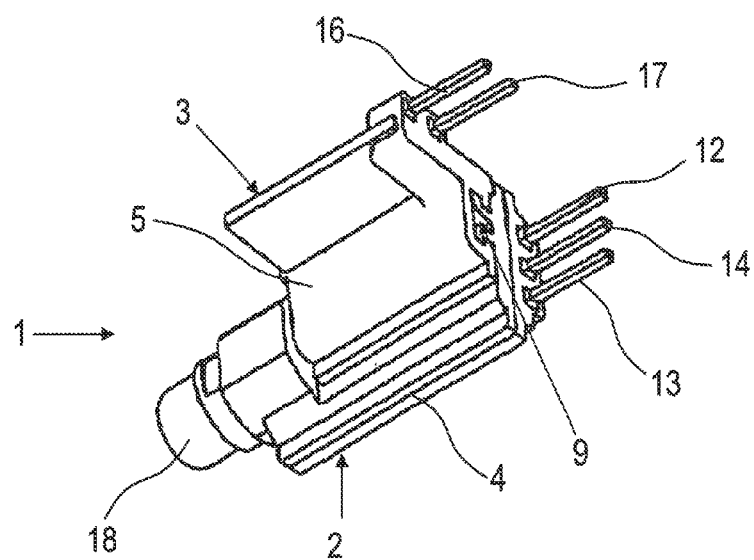
FIG. 1 shows the diagrammatic structure of a first exemplary embodiment of a sensor arrangement which consists of two assembled sensor components.

The following list of reference symbols may be used in conjunction with the drawings:

1 Sensor arrangement
2, 3 Sensor component
4, 5 Housing
6, 7, 8 Sensor element
9 Connecting device
10 Groove
11 Tongue
12, 13, 14, 16, 17 Electrical connecting contact
15 Printed circuit board
18 Cap
A, A' Sectional axis

DETAILED DESCRIPTION OF ILLUSTRATIVE EMBODIMENTS

FIG. 1 diagrammatically shows the structure of a sensor arrangement 1 comprising a first sensor component 2 and a second sensor component 3. The housing 4 of the first sensor component 2 and the housing 5 of the second sensor component 3 are mechanically connected to one another by means of a connecting device 9. The connecting device 9 is illustrated in detail in FIG. 2. Both the first sensor component 2 and the second sensor component 3 each have electrical connections 12, 13, 14. The first sensor component 2 has three electrical connections 12, 13, 14. The second sensor component 3 has two electrical connections 16, 17. The first sensor component 2 has an optically transparent cap 18.

Figure 2:
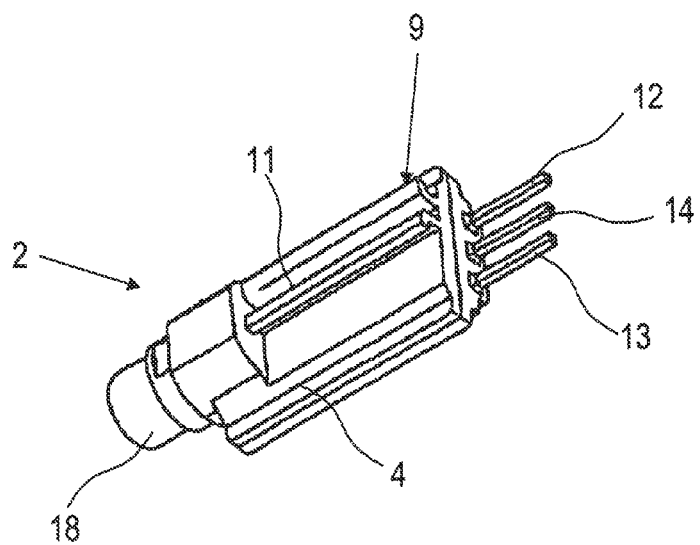
FIG. 2 diagrammatically shows a three-dimensional view of a first sensor component.

FIG. 2 illustrates a three-dimensional view of the first sensor component 2. The first sensor component 2 has a housing 4. One part of a connecting device 9 in the form of a tongue 11 is arranged on the top side of the housing 4. In the embodiment illustrated, the tongue 11 is arranged to the side of the central axis of the first sensor component 2. The tongue 11 is in the form of a dovetail connection. The tongue 11 has a slot running in the longitudinal direction of the tongue 11. In the embodiment illustrated, the first sensor component 2 has three electrical connecting contacts 12, 13, 14. In another embodiment, it is also possible for the first sensor component 2 to have only two electrical connections.

Figure 3A:
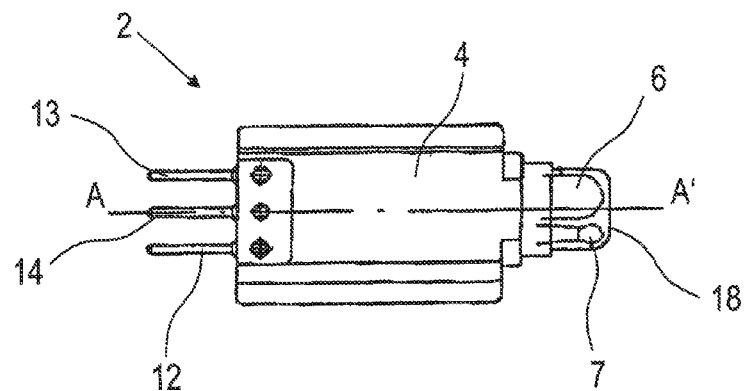
FIG. 3a diagrammatically shows a view of the underside of the first sensor component.
Figure 3B:
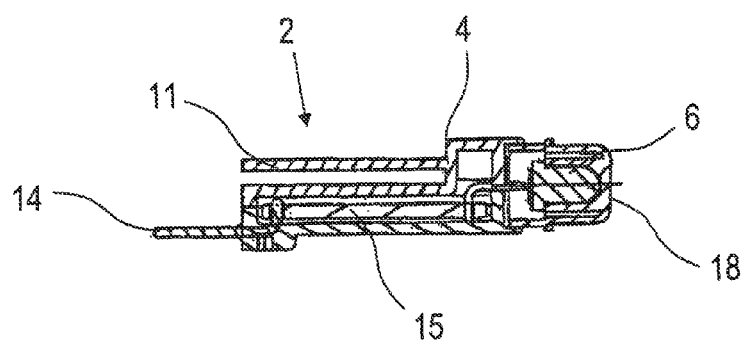
FIG. 3b shows a cross section through a sensor component according to FIG. 3a along the sectional axis A-A'.

FIG. 3a shows a view of the underside of a first sensor component 2 according to the embodiment in FIG. 2. In the embodiment illustrated, the housing 4 of the first sensor component 2 has three electrical connecting contacts 12, 13, 14. In the embodiment illustrated, the positions of two sensor elements 6, 7 are indicated on an end face of the housing 4. In the embodiment illustrated, the sensor elements 6, 7 are arranged inside the housing 4, as can be seen in FIG. 3b. The sensor elements 6, 7 are partially surrounded by an optically transparent cap 18. The sensor elements 6, 7 can be electrically contact-connected using three connecting contacts 12, 13, 14. One of the three connecting contacts 12, 13, 14 is used as common ground of the two sensor elements 6, 7, for example, and is coupled to a respective connection of the sensor elements.

In another embodiment which is not illustrated, it is also possible for a plurality of sensor elements 6, 7 to each have completely separate connecting contacts.

FIG. 3b shows a cross section through the second sensor component 2 according to the embodiment in FIG. 3a along the sectional axis A-A'. The housing 4 of the first sensor component 2 has a printed circuit board 15. A sensor element 6 which is connected to a printed circuit board 15 is arranged in a sensor region of the housing 4. The electrical contacts of the sensor element 6 are routed to electrical connecting contacts 13, 14 via conductor tracks on the printed circuit board 15. A tongue 11 as part of a dovetail connection is illustrated in the upper region of the housing.

Figure 3C:
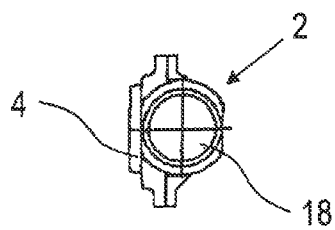
FIG. 3c diagrammatically shows a side view of the first sensor component.

FIG. 3c diagrammatically shows a view of the housing 4 of the first sensor component 2 from the end face. In the region of the end face, the housing 4 of the first sensor component 2 has an optically transparent cap 18 inside which the sensor elements of the first sensor component 2 are arranged.

Figure 4:
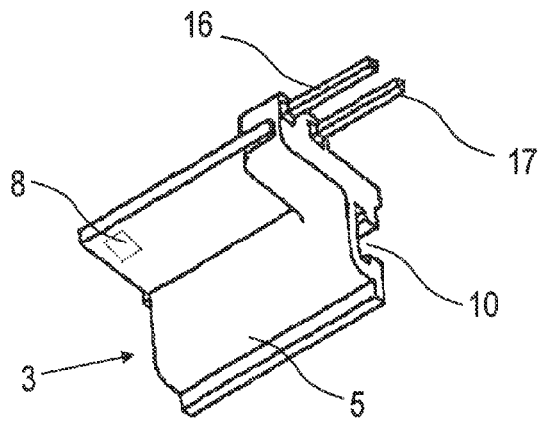
FIG. 4 diagrammatically shows a three-dimensional view of a second sensor component.

FIG. 4 diagrammatically shows the structure of a second sensor component 3 in a perspective view. The housing 5 of the second sensor component 3 has a groove 10 as part of a connecting device. In the embodiment illustrated, the housing 5 of the second sensor component 3 has two reference planes which are arranged approximately at right angles to one another. The groove 10 of the plug-in connection is assigned to a first reference plane. A sensor element 8 on the rear side of the sensor component 3 is indicated in the region of the second reference plane. The sensor element 8 can be contact-connected from the outside via electrical connecting contacts 16, 17.

Figure 5A:
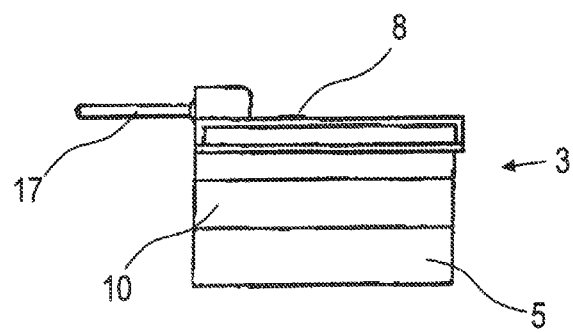
FIG. 5a diagrammatically shows a side view of the second sensor component.

FIG. 5a shows a view of the embodiment of the second sensor component 3 from the rear side of the housing 5. The housing 5 of the second sensor component 3 has a groove 10 in the lower region, which groove extends over the entire width of the housing 5. A sensor element 8 is arranged in the upper region and can be contact-connected via electrical connecting contacts 17.

Figure 5B:
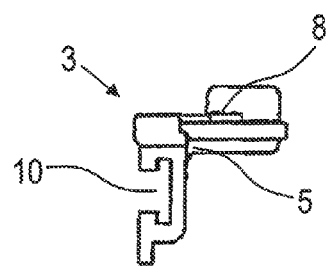
FIG. 5b diagrammatically shows another side view of the second sensor element.

FIG. 5b shows the profile of the housing 5 of the second sensor component 3 according to the embodiment in FIG. 4. The housing 5 of the second sensor component 3 has a sensor element 8 on the top side. The sensor element 8 is arranged on a surface of the housing 5 that is arranged perpendicular to the first reference plane of the housing 5. The groove 10 has approximately a T shape in profile. The groove 10 is preferably designed such that the tongue 11 of the first sensor component 2 engages in the groove 10 of the second component 3 in a form-fitting manner.

Although only a restricted number of possible developments of the invention could be described in the exemplary embodiments, the invention is not restricted thereto. In principle, it is possible for the sensor arrangement to comprise a plurality of sensor components which are mechanically connected to one another via connecting devices and to have a plurality of sensor elements which are thermally decoupled.

The description of the items specified here is not restricted to the individual special embodiments; rather, the features of the individual embodiments can be combined with one another in any desired manner, if technically useful.

What is claimed is:

1. A sensor arrangement comprising:
a first sensor component comprising a sensor element and a housing having an outside housing wall; and
a second sensor component comprising a sensor element and a housing having an outside housing wall;
wherein the sensor element of the first sensor component is thermally insulated from the sensor element of the second sensor component,
wherein each housing comprises a portion of a tongue-and-groove plug-in connection that mechanically connects the first and second sensor components to one another,
wherein the second sensor component has a first part and a second part arranged approximately at a right angle with respect to the first part, a part of the connecting device comprising the first part and the sensor element being located on the second part,
wherein the sensor element of the first sensor component is arranged in a depression in the outside housing wall or on an outer surface of the outside housing,
wherein the housing of the first sensor component is thermally decoupled from the housing of the second sensor component,
wherein the first sensor component comprises at least two electrical connecting contacts for electrical connection of the sensor element of the first sensor, and
wherein the second sensor component comprises at least two electrical connecting contacts for electrical connection of the sensor element of the second sensor.

2. The sensor arrangement according to claim 1, wherein the tongue-and-groove plug-in connection comprises a dovetail connection or a fir tree connection.

3. The sensor arrangement according to claim 1, wherein the sensor element of the first or second sensor component is arranged on a printed circuit board that is arranged in the housing of that sensor component.

4. The sensor arrangement according to claim 1, wherein the housing of each of the sensor components comprises a plastic.

5. The sensor arrangement according to claim 1, wherein the sensor elements of the first and second sensor components comprise temperature sensor elements.

6. The sensor arrangement according to claim 5, wherein the temperature sensor elements comprise negative temperature coefficient (NTC) elements.

7. The sensor arrangement according to claim 1, wherein at least one sensor component comprises an optically transparent cap in a region of the at least one sensor element.

8. The sensor arrangement according to claim 1, wherein a first sensor component comprises an optical sensor, and a further sensor element comprises an NTC element.

9. A measuring arrangement for detecting temperature using a sensor arrangement according to claim 1, wherein the sensor element of the first sensor component detects a temperature of a first temperature zone and wherein the sensor element of the second sensor component detects a temperature of a second temperature zone.

10. A sensor arrangement comprising:
a first sensor component comprising a housing with a sensor element and a plurality of electrically connecting contacts electrically connected to the sensor element and extending outside the housing of the first sensor component;
a second sensor component comprising a housing with a sensor element and a plurality of electrically connecting contacts electrically connected to the sensor element and extending outside the housing of the second sensor component, the second sensor component having a first part and a second part arranged approximately at a right angle with respect to the first part, wherein a plug-in connection is comprised by the first part and the sensor element is located on the second part, the sensor element being arranged in a depression in an outside housing wall or on an outer surface of the housing wall of the second part of the housing of the second sensor component; and
a connecting device mechanically connecting the housing of the first sensor component to the housing of the second sensor component, the connecting device including the plug-in connection of the second sensor component;
wherein the sensor element of the first sensor component is thermally insulated from the sensor element of the second sensor component, and wherein the housing of the first sensor component is thermally decoupled from the housing of the second sensor component.

11. The sensor arrangement according to claim 10, wherein the connecting device comprises a tongue-and-groove plug-in connection, the housing of the second sensor component comprising a groove and the housing of the first sensor component comprising at least one tongue.

12. The sensor arrangement according to claim 10, wherein the sensor elements of the first and second sensor components each comprise a temperature sensor element.

13. The sensor arrangement according to claim 12, wherein the temperature sensor elements are designed as negative temperature coefficient (NTC) elements.

14. The sensor arrangement according to claim 10, wherein the first sensor component comprises an optically transparent cap adjacent the sensor element of the first sensor component.

15. The sensor arrangement according to claim 10, where the first sensor component comprises both an optical sensor and a temperature sensor element that comprises an NTC element.

16. The sensor arrangement according to claim 10, wherein the sensor element of the first sensor component is configured to detect a temperature of a first temperature zone and wherein the sensor element of the second sensor component is configured to detect a temperature of a second temperature zone.

17. The measuring device according to claim 10, wherein the electrically connecting contacts of the first sensor component and the electrically connecting contacts of the second sensor component extend parallel to one another in the same direction away from an outer surface of the measuring device.

* * * * *